United States Patent [19]

Nakamura

[11] Patent Number: 4,533,371
[45] Date of Patent: Aug. 6, 1985

[54] VACUUM CLEANER

[75] Inventor: Katsutoshi Nakamura, Nara, Japan

[73] Assignee: Kabushiki Kaisha SUIDEN, Osakashi, Japan

[21] Appl. No.: 548,831

[22] Filed: Nov. 4, 1983

[30] Foreign Application Priority Data

Apr. 25, 1982 [JP] Japan .............................. 57-60876[U]
Apr. 25, 1982 [JP] Japan .............................. 57-60877[U]

[51] Int. Cl.³ ............................................ B01D 46/04
[52] U.S. Cl. ..................................... 55/299; 55/300;
55/305; 55/324; 55/334; 55/341 R; 55/DIG. 3;
15/347; 15/352
[58] Field of Search ................. 55/285, 295, 299, 300,
55/304, 305, 323, 324, 334, 341 R, DIG. 3;
15/347, 352

[56] References Cited

U.S. PATENT DOCUMENTS

| 2,594,456 | 4/1952 | Kroenlein | 55/300 |
| 2,927,659 | 3/1960 | Pabst et al. | 55/324 |
| 3,882,532 | 7/1974 | Weisgerber | 55/324 |
| 3,898,414 | 8/1975 | Hawley | 55/299 |
| 4,443,235 | 4/1984 | Brenholt et al. | 55/299 |

FOREIGN PATENT DOCUMENTS

| 404608 | 12/1909 | France | 55/305 |
| 5114 | 2/1971 | Japan | 55/300 |
| 228405 | 1/1944 | Switzerland | 55/341 R |
| 1335344 | 10/1973 | United Kingdom | 55/304 |

*Primary Examiner*—David L. Lacey
*Attorney, Agent, or Firm*—Barnes & Thornburg

[57] ABSTRACT

A vacuum cleaner including a dust chamber, a vacuum chamber and a source for producing low pressure in the vacuum chamber, wherein the dust chamber and the vacuum chamber are partitioned by a first filter unit, and wherein the vacuum chamber is provided with a secondary filter unit in which at least one filter element is suspended from the ceiling of the vacuum chamber radially thereof. A rotary shaft is provided at the center of the radially arranged filter elements, the rotary shaft radially supporting vibrating vanes, each of which is designed to vibrate each filter element of the secondary filter unit on its inner peripheral portion, thereby causing the dust entrained therein to fall off by vibration. The rotary shaft is additionally provided with a single vibrating arm horizontally extended so as to vibrate each filter element of the secondary filter unit on its bottom portion.

10 Claims, 3 Drawing Figures

VACUUM CLEANER

BACKGROUND OF THE INVENTION

The present invention relates to a vacuum cleaner having a dual filter structure whereby the collected dust and dirt is dually filtered out, thereby protecting the motor against choking due to dust. More particularly, the present invention relates to a vacuum cleaner having a dual filter structure of which one filter unit is subjected to timely vibration, thereby protecting the same against choking due to dust entrained thereon.

The vacuum cleaner is known, and widely used for house, factory and office cleaning. The vacuum cleaner is provided with a filter whereby the collected dust and dirt is filtered out. The conventional filter is provided in the form of a bag, commonly called a filter bag. However, it is difficult to filter out the dust and dirt with such a filter bag, and unfiltered impurities pass through the filter meshes, and enter into the cage of the motor, where they stick to every oily surface of the motor components. Eventually, the build-up of the impurities causes choking of the motor, and at least reduces its efficiency. Choking often leads to seizure, and shortens the life of the motor. In addition, the filter elements are also liable to become blocked.

OBJECTS AND SUMMARY OF THE INVENTION

The present invention is directed toward solving the problems pointed out above, and has for its object to provide a vaccum cleaner having a dual filter structure which is provided with a dust removing means, whereby the motor is protected against choking over a long period of use.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a vacuum cleaner which comprises:

a dust chamber for collecting dust, dirt and moisture;

a vacuum chamber located above the dust chamber, the vacuum chamber including an air inlet through which the outside air is drawn therein under low pressure;

means for creating low pressure in the vacuum chamber;

a plurality of first filter elements located between the dust chamber and the vacuum chamber;

a plurality of secondary filter elements suspended from the ceiling of the vacuum chamber, wherein the secondary filter elements are radially arranged around a rotary shaft supported axially of the vacuum chamber;

a vibrating means for causing the dust and dirt entrained in the secondary filter elements to fall off by vibration, wherein the vibrating means comprises a plurality of vanes fixed to the rotary shaft, and a single vibrating arm horizontally extended therefrom; and a driving means for rotating the rotary shaft alternately in a clockwise and counter-clockwise direction.

DETAILED DESCRIPTION OF THE INVENTION

Figure 1:
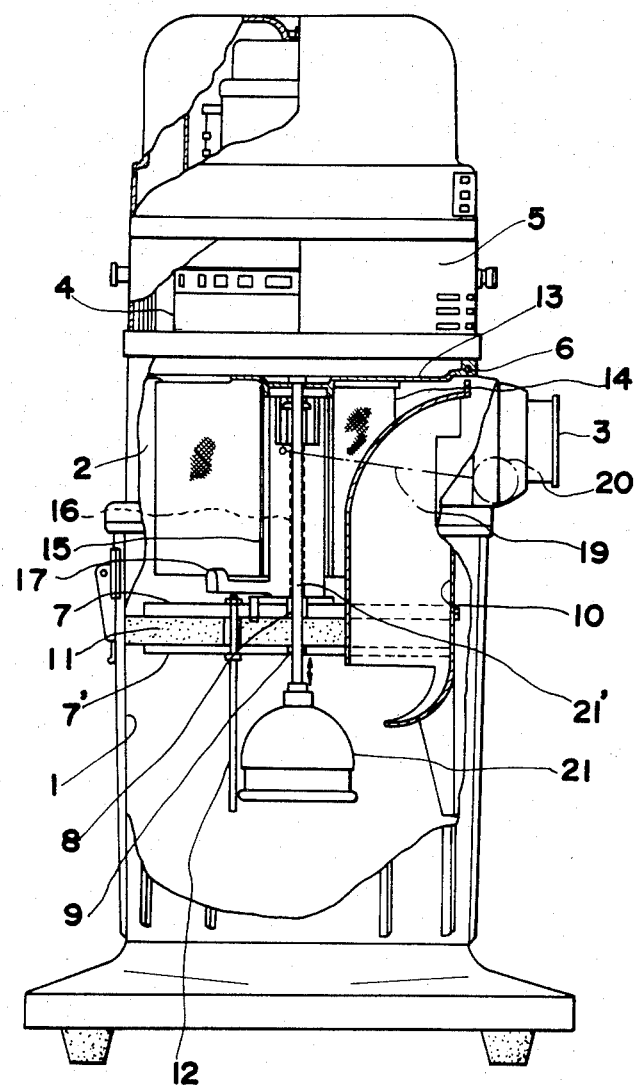
FIG. 1 is a vertical cross-section through a vacuum cleaner embodying the present invention.
Figure 2:
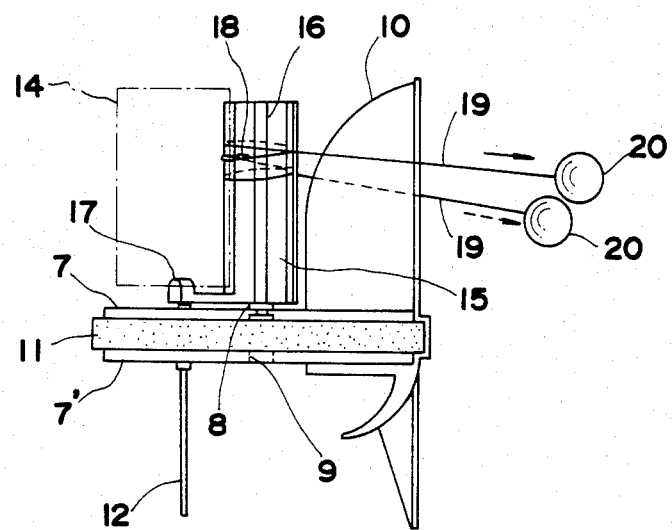
FIG. 2 is a fragmentary side view showing the main section of the vacuum cleaner of FIG. 1.
Figure 3:
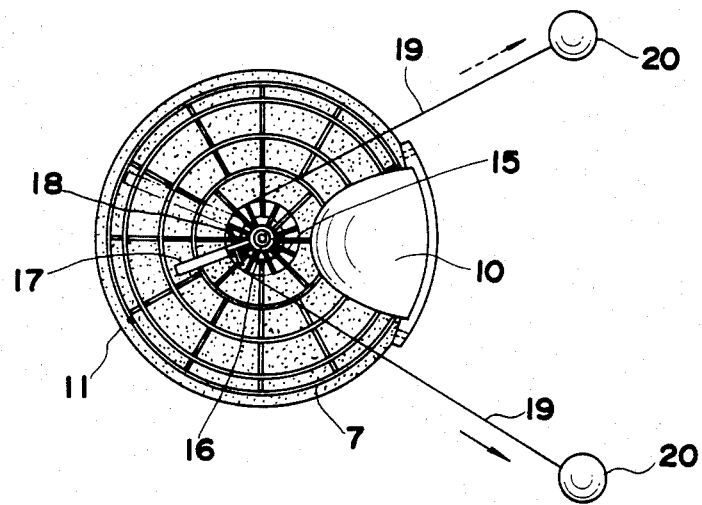
FIG. 3 is a plan view of the section shown in FIG. 2.

Referring to FIG. 1, dust is collected in a dust chamber 1, above which a vacuum chamber 2 is removably provided. The vacuum chamber 2 has an air inlet 3. There is provided an electric motor 4 located in a motor chamber 5, which is airtightly fixed to the vacuum chamber 2 with the use of an air seal 6, such as an O-ring. The reference numerals 7, 7' designate a pair of filter supports of lattice structure, each of which is made up of a plurality of concentrically arranged rings and radially arranged spokes supporting the rings. The upper filter support 7 has a bearing section 8 at its center, and the lower filter support 7' has an aperture 9. The reference numeral 10 designates an air duct communicating with the air inlet 3, the air duct 10 being passed through a peripheral portion of the filter supports 7, 7', so as to allow air drawn in to pass through the filter unit 11. The filter unit 11 is fixed by a bolt 12 between the filter supports 7 and 7'. In this way the dust chamber 1 and the vacuum chamber 2 are partitioned by the filter unit 11.

The bearing section 8 of the upper filter support 7 rotatively supports a hollow shaft 16, which radially supports a plurality of vibrating vanes 15. The vibrating vanes 15 are designed to remove the dust entrained in secondary filter elements 14 suspended from the ceiling 13 of the vacuum chamber 2, wherein the vibrating vanes 15 vibrate each of the secondary filter elements 14 on its peripheral portion while they are in rotation. The ceiling 13 has a number of recesses (not shown) corresponding to that of the second filter elements 14, and each of the filter elements 14 is fixedly inserted therein. In addition, one of the vibrating vanes 15 is provided with vibrating arm 17 horizontally extending therefrom, whereby each bottom portion of the suspended filter elements 14 is vibrated so as to allow the dust entrained on the filters 14 to fall off. The vibrating vanes 15 are rotated in the following way:

One of the vibrating vanes 15 is provided with a small pipe 18 through which a string 19 is passed. Each end of the string is passed through an opening in the vacuum chamber and a grip ball 20 is provided at each end. The operator holds the grip balls with both hands and pulls each end of string 19 alternately thereby causing the hollow shaft 16 to rotate on the bearing section 8 alternately in a clockwise and counterclockwise direction. The string 19 is of such length that the grip balls may be stored in the air inlet 3 when no in use.

The reference numeral 21 designates a float usable for indicating a liquid level if water, waste oil or any other liquid is introduced into the dust chamber 1. The detailed description of its structure and function will be omitted for simplicity.

As evident from the foregoing description, the vacuum cleaner of the invention is provided with a first filter unit and a secondary filter unit, of which the filter elements of the secondary unit are subjected to vibration caused by the vibrating vanes 15 and the vibrating arm 17, thereby allowing the dust and dirt entrained thereon to fall off. Thus the filter elements 14 are kept free from an undesirable buid-up of dust. This ensures a constant filtering efficiency of the second filter unit.

According to the present invention, the vacuum cleaner has two filter units, that is, the first filter unit and the secondary filter unit, wherein the first filter unit is made in relatively large meshes whereas the secondary filter unit is made in relatively small meshes. Owing to the dual filter system, the collected dust and dirt is filtered out twice, thereby ensuring that the impurities are prevented from entering the motor cage.

What is claimed is:

1. A vacuum cleaner comprising:
   chamber means,
   vacuum source means communicating with said chamber means,
   air inlet means,
   rotatable shaft means axially supported within said chamber means,
   filter means comprising at least one filter element radially arranged around said rotatable shaft means,
   vibrating means for vibrating said filter means comprising at least one radially extending vane means fixed to said axially supported rotatable shaft, said at least one radially extending vane means being of sufficient length to physically contact said at least one filter element upon rotation of said rotatable shaft, and
   driving means for rotating said vibrating means.

2. The vacuum cleaner of claim 1 further comprising engaging means connected to at least one of said at least one radially extending vane means, said driving means comprising string means engaging said engaging means, said string means extending outside of said chamber means.

3. The vacuum cleaner of claim 2 wherein grip means are fixed to each end of said string means to accommodate manual operation of the vibrating means.

4. The vacuum cleaner of claim 1 wherein said at least one filter element comprises a plurality of radially arranged filter elements.

5. The vacuum cleaner of claim 1 wherein said at least one vane means comprises a plurality of radially extending vane means.

6. A vacuum cleaner comprising:
   chamber means, said chamber means having first and second compartments separated by a first filter means,
   vacuum source means communicating with said first compartment,
   air inlet means,
   rotatable shaft means axially supported within said chamber means,
   second filter means comprising at least one filter element radially arranged around said rotatable shaft means,
   vibrating means for vibrating said second filter means comprising at least one radially extending vane means fixed to said axially supported rotatable shaft, said at least one radially extending vane means being of sufficient length to contact said at least one filter element upon rotation of said rotatable shaft, and
   driving means for rotating said vibrating means.

7. The vacuum cleaner of claim 6 further comprising engaging means connected to at least one of said at least one radially extending vane means, said driving means comprising string means engaging said engaging means, said string means extending outside of said chamber means.

8. The vacuum cleaner of claim 7 wherein grip means are fixed to each end of said string means to accommodate manual operation of the vibrating means.

9. The vacuum of claim 6 wherein said at least one filter element comprises a plurality of radially arranged elements.

10. The vacuum cleaner of claim 6 wherein said at least one vane means comprises a plurality of radially extending vane means.

* * * * *